(12) United States Patent
Morimoto

(10) Patent No.: US 9,323,194 B1
(45) Date of Patent: Apr. 26, 2016

(54) FIXING DEVICE, IMAGE FORMING APPARATUS AND METHOD OF CONTROLLING FIXING DEVICE

(71) Applicant: KYOCERA Document Solutions Inc., Osaka (JP)

(72) Inventor: Satoshi Morimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/952,328

(22) Filed: Nov. 25, 2015

(30) Foreign Application Priority Data

Nov. 28, 2014 (JP) .................................. 2014-241506

(51) Int. Cl.
| | |
|---|---|
| *G03G 15/20* | (2006.01) |
| *G03G 15/00* | (2006.01) |
| *G01K 7/22* | (2006.01) |
| *G01K 13/00* | (2006.01) |

(52) U.S. Cl.
CPC .............. *G03G 15/2078* (2013.01); *G01K 7/22* (2013.01); *G01K 13/00* (2013.01); *G03G 15/55* (2013.01)

(58) Field of Classification Search
CPC ..... G03G 15/2078; G03G 15/55; G01K 7/22; G01K 13/00
USPC .................................................... 399/69, 334
See application file for complete search history.

(56) References Cited

U.S. PATENT DOCUMENTS

| | | | | |
|---|---|---|---|---|
| 2002/0108947 A1* | 8/2002 | Tsuruya | ............ | G03G 15/2003 219/619 |
| 2005/0123314 A1* | 6/2005 | Satoh | ................. | G03G 15/2039 399/69 |
| 2007/0242959 A1* | 10/2007 | Aono | ................. | G03G 15/5004 399/13 |
| 2009/0304405 A1* | 12/2009 | Takahashi | .......... | G03G 15/2039 399/69 |

FOREIGN PATENT DOCUMENTS

JP       2010-49093 A       3/2010

* cited by examiner

*Primary Examiner* — Hoang Ngo
(74) *Attorney, Agent, or Firm* — Stein IP, LLC

(57) ABSTRACT

A fixing device includes: a sensor circuit portion which includes a plurality of series circuits of thermistors and capacitors and in which the capacitors differ from each other in capacitance; a signal circuit portion to which each sensor output voltage that is a voltage between the thermistor and the capacitor is input and which switches between output levels each time the sensor output voltage that exceeds a threshold value is increased; and a processing circuit that includes a output port to which the series circuits are connected so as to be parallel to each other and an input port and that recognizes a target temperature to be detected with each of the thermistors based on a rising time since the start of the voltage application to each of the series circuits until the output signal rises and a falling time until the output signal falls that are measured.

10 Claims, 7 Drawing Sheets

FIG.6
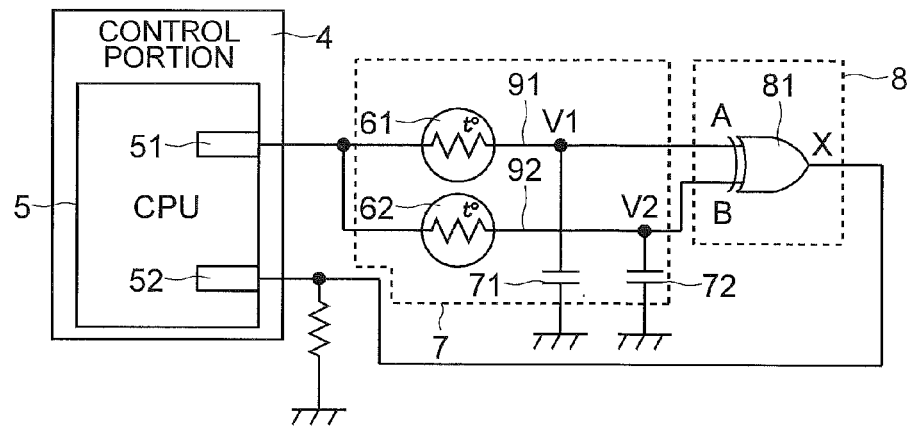
FIG.7
| V1 | V2 | X |
|----|----|---|
| L  | L  | L |
| L  | H  | H |
| H  | H  | L |
| H  | L  | H |
FIG.8
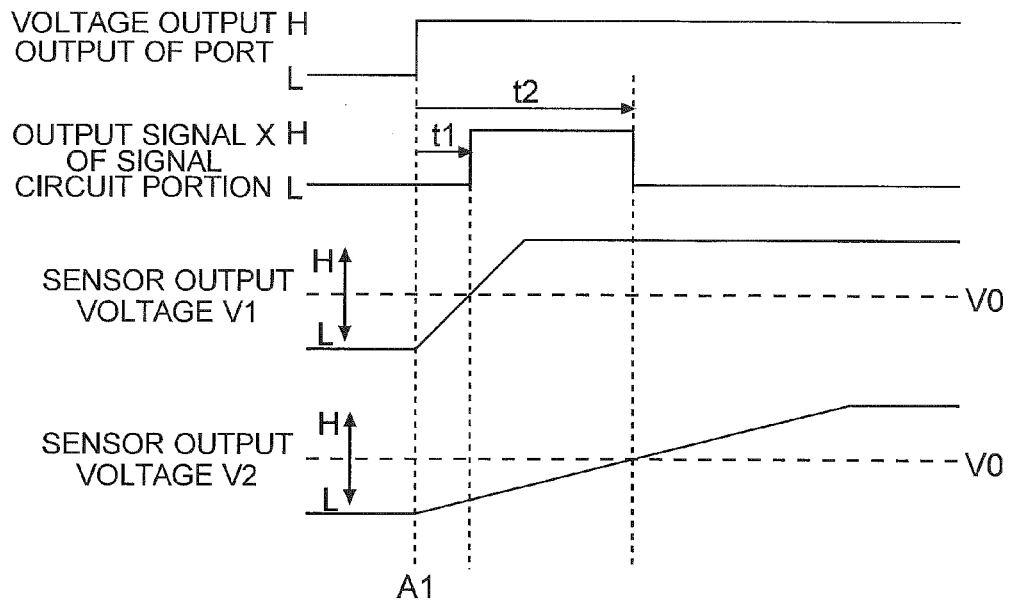

FIG.9
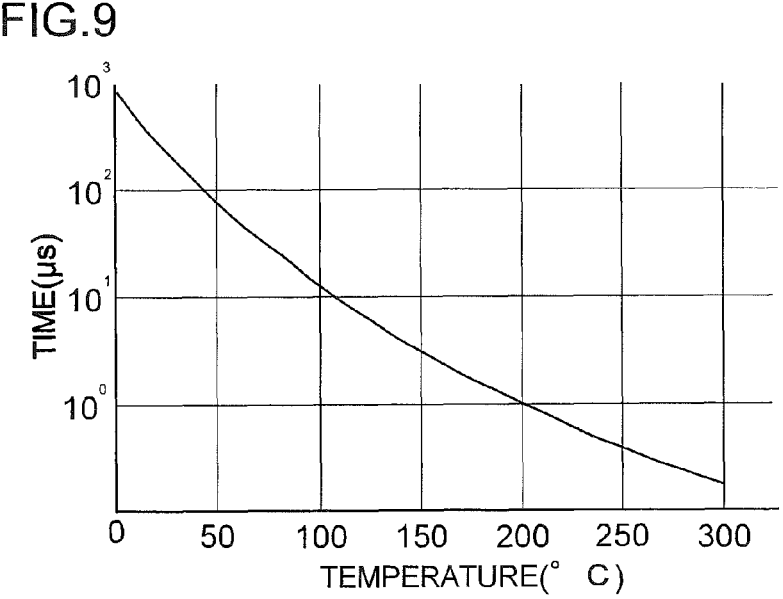
FIG.10
| TEMPERATURE (°C) | RISING TIME t1 (SECOND) | FALLING TIME t2 (SECOND) |
|---|---|---|
| 20 | T11 | T21 |
| 21 | T12 | T22 |
| ... | ... | ... |
| X | T1x | T2x |
| ... | ... | ... |
D1
FIG.11
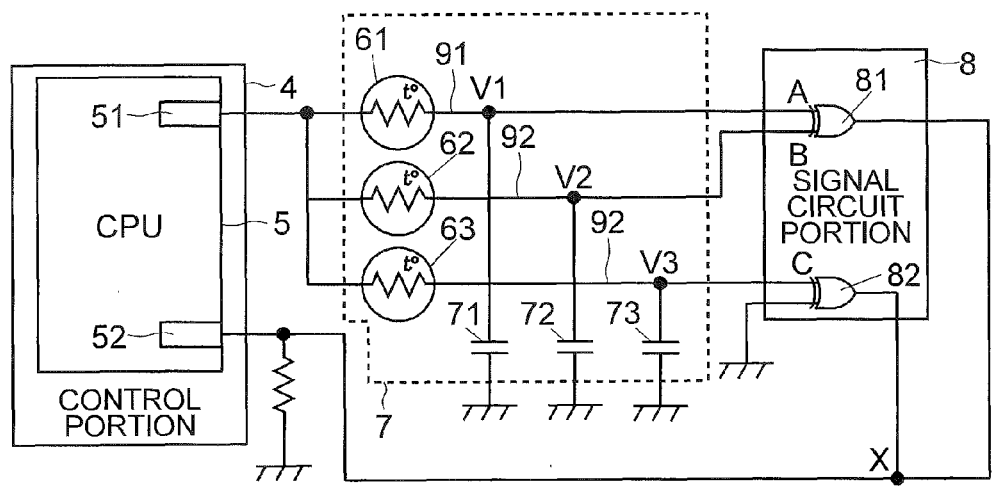

| | TEMPERATURE (°C) | FIRST TIME t3 (SECOND) | SECOND TIME t4 (SECOND) | THIRD TIME t5 (SECOND) |
|---|---|---|---|---|
| D1 | 20 | T31 | T41 | T51 |
| | 21 | T32 | T42 | T52 |
| | ... | ... | ... | ... |
| | X | T3x | T4x | T5x |
| | ... | ... | ... | ... |

Prior Art

FIXING DEVICE, IMAGE FORMING APPARATUS AND METHOD OF CONTROLLING FIXING DEVICE

This application is based upon and claims the benefit of priority from the corresponding Japanese Patent Application No. 2014-241506 filed on Nov. 28, 2014, the entire contents of which are incorporated herein by reference.

BACKGROUND

The present disclosure relates to a fixing device that fixes a toner image to a sheet and an image forming apparatus that includes a fixing device.

In an image forming apparatus that uses a toner to perform printing, a fixing device that pressurizes and heats a toner image transferred to a sheet is provided. The fixing device includes a heating rotation member that is heated by a heater and that makes contact with the sheet. The temperature of the heating rotation member is detected so that the heating rotation member is maintained at a temperature suitable for fixing and is prevented from being excessively heated. Here, a thermistor may be used for the temperature detection. The thermistor is provided for the heating rotation member and is connected to a resistor. A voltage between the thermistor and the resistor is taken out. The resistance value of the thermistor is varied with the temperature. The resistance value of the thermistor and a target temperature to be detected are determined according to the magnitude of the voltage taken out. Examples of the image forming apparatus having a circuit that performs temperature detection based on a voltage between a thermistor and a resistor include the followings.

Specifically, an image forming apparatus is known which has a fixing temperature detection circuit that includes a fixing thermistor and a fixed resistor and in which a connection point between the fixing thermistor and the fixed resistor is input to a print control portion 1 for performing AD conversion.

As described above, conventionally, a series circuit of a thermistor and a fixed resistor is provided, a voltage value between the thermistor and the fixed resistor is subjected to AD conversion and thus temperature detection is performed on a fixing device. An example of such a conventional circuit is shown in FIG. 14.

In the circuit of FIG. 14, for a series circuit 3000 of one thermistor 1000 and a fixed resistor 2000, one analogue-digital conversion circuit (AD conversion circuit) is needed. When an AD conversion circuit incorporating an integrated circuit such as a CPU or a microcomputer is used, a voltage between the thermistor 1000 and the resistor 2000 is input to an AD conversion port.

On the other hand, in order to perform temperature detection on both ends of a heating rotation member and the center position thereof, a plurality of thermistors may be provided in the heating rotation member. In an image forming apparatus, one or a plurality of thermistors for temperature detection may further be provided in other members within a fixing device or in places other than the fixing device.

However, when a plurality of thermistors are provided, an integrated circuit that has the same number of AD conversion ports as the number of thermistors that are provided needs to be adopted. Hence, disadvantageously, the choices of the integrated circuit to be adopted are limited. An integrated circuit having a large number of AD conversion ports may be expensive.

An AD conversion port of an integrated circuit may not be allocated to a thermistor. In such a case, an AD conversion circuit is provided separately from an integrated circuit. Consequently, it is difficult to reduce the manufacturing cost of an image forming apparatus. Even in the known image forming apparatus described above, the same number of AD conversion circuits and the same number of AD conversion ports as the number of thermistors that are provided are needed. Hence, it is impossible to solve the above problem.

SUMMARY

A fixing device according to one aspect of the present disclosure includes a heating rotation member, a heater, a sensor circuit portion, a signal circuit portion and a processing circuit. The heating rotation member heats a toner image transferred to a sheet. The heater heats the heating rotation member. The sensor circuit portion includes a plurality of series circuits of thermistors for detecting the temperature of the heating rotation member and capacitors and the capacitors of the series circuits differ from each other in capacitance. A sensor output voltage that is a voltage between the thermistor and the capacitor in each of the series circuits is input to the signal circuit portion, and the signal circuit portion switches between a high level and a low level of an output signal each time the sensor output voltage that exceeds a predetermined threshold value is increased. The processing circuit includes: a voltage output port which applies a voltage to each of the series circuits and to which the series circuits are connected so as to be parallel to each other; and an input port to which the output signal is input, measures a rising time since the start of the voltage application to each of the series circuits until the output signal rises and a falling time since the start of the voltage application to each of the series circuits until the output signal falls and recognizes a target temperature to be detected with each of the thermistors based on the rising time and the falling time.

Further features and advantages of the present disclosure will become apparent from the description of embodiments given below.

BRIEF DESCRIPTION OF THE DRAWINGS

FIG. 6 is a diagram showing an example of a portion of the fixing device according to the embodiment that performs temperature detection.

FIG. 7 is a diagram showing an example of a truth table in a signal circuit portion according to the embodiment.

FIG. 8 is a timing chart showing an example of variations in signals on the temperature detection in the fixing device according to the embodiment.

FIG. 9 is a graph showing an example of a time until a voltage between a thermistor and a capacitor is increased to a threshold value with respect to the target temperature to be detected.

FIG. 10 is a diagram showing an example of temperature detection data used to detect the target temperatures to be detected with the thermistors.

FIG. 11 is a diagram showing an example of a portion of a fixing device according to a variation that performs temperature detection.

DETAILED DESCRIPTION

In the following description of the present disclosure, without the use of an integrated circuit having a large number of AD conversion ports (AD conversion circuits), a plurality of thermistors provided for a heating rotation member are used, and thus it is possible to detect the temperatures of a plurality of places. In a development stage, the choices of an integrated circuit such as a CPU are increased. Hence, an embodiment of the present disclosure will be described with reference to FIGS. 1 to 13. In the following description, as an image forming apparatus including a fixing device 1, a printer 100 is used as an example. However, individual elements such as configurations, arrangements and the like described in the embodiment do not limit the scope of the disclosure, and are simply illustrative examples.

(Outline of Image Forming Apparatus)

Figure 1:
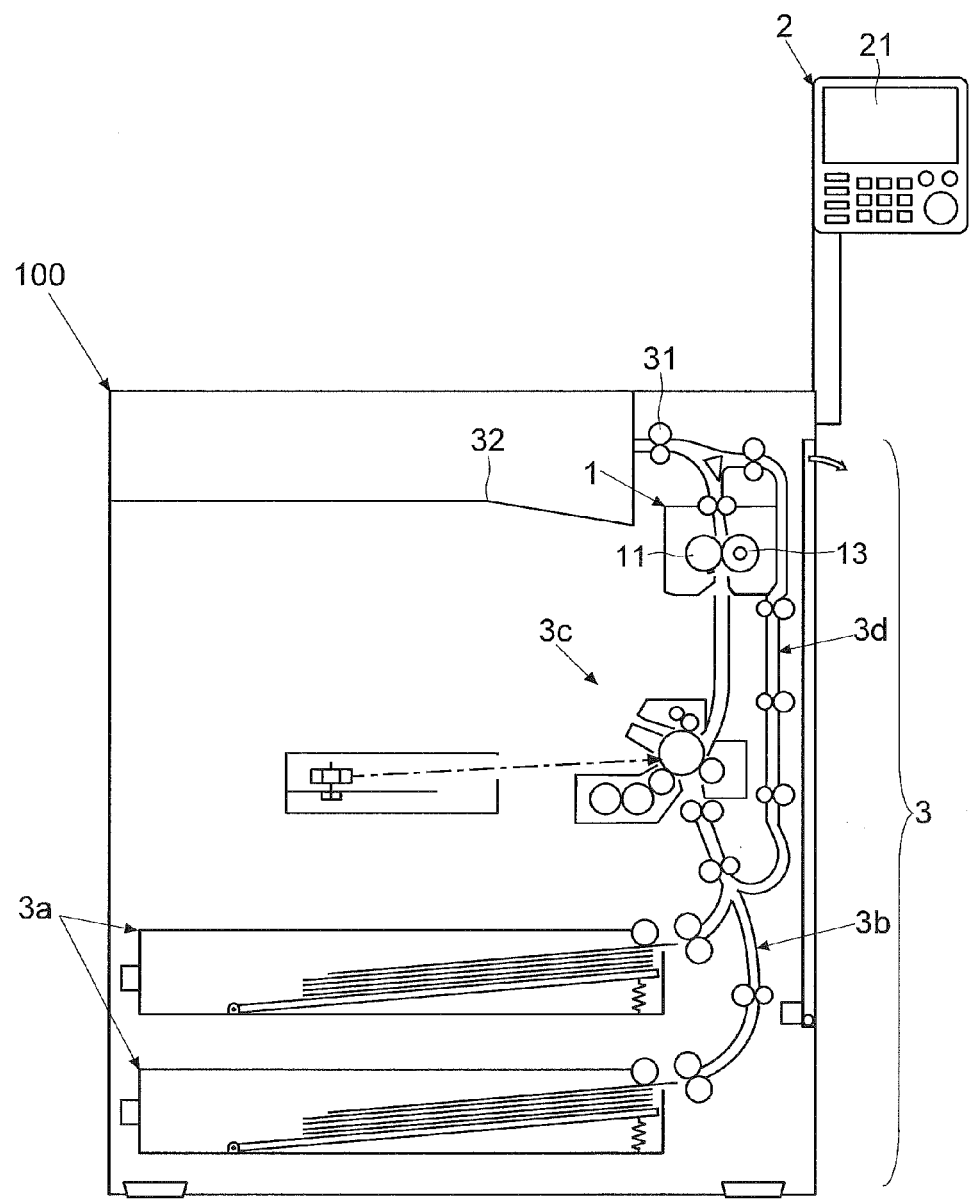
FIG. 1 is a diagram showing the structure of a printer according to an embodiment.

An outline of a printer 100 according to the embodiment will first be described with reference to FIG. 1. As shown in FIG. 1, the printer 100 of the present embodiment includes an operation panel 2 that is attached to a side thereof. The printer 100 includes, therewithin, as a print portion 3, a paper feed portion 3a, a transport portion 3b, an image formation portion 3c, the fixing device 1 and a double-sided transport portion 3d.

The operation panel 2 includes a display portion 21 that displays the state of the printer 100, various types of messages and various types of setting screens. The display portion 21 is a touch panel type. The operation panel 2 receives print settings.

The paper feed portion 3a is arranged in a lower portion within the printer 100. The paper feed portion 3a stores a plurality of sheets, and feeds out the sheet at the time of printing. The transport portion 3b transports the sheet supplied from the paper feed portion 3a. The image formation portion 3c forms a toner image and transfers the toner image formed on the sheet transported. The fixing device 1 heats and pressurizes the sheet to which the toner image is transferred, and thereby fixes the toner image to the sheet. The sheet passing through the fixing device 1 is ejected into an ejection tray 32 by an ejection roller pair 31.

(Hardware Configuration of Printer 100)

Figure 2:
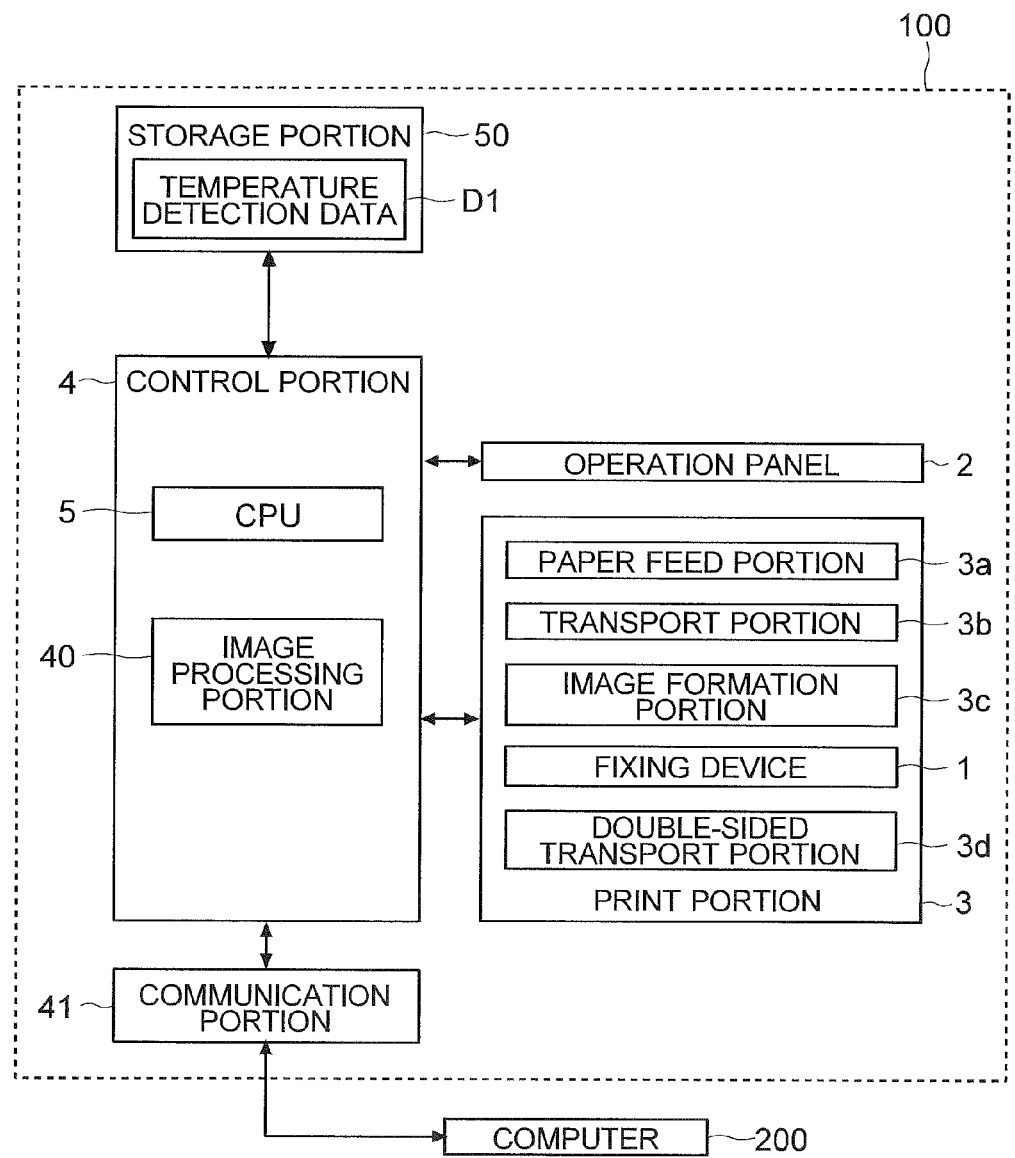
FIG. 2 is a diagram showing the hardware configuration of the printer according to the embodiment.

The hardware configuration of the printer 100 according to the embodiment will then be described with reference to FIG. 2. As shown in FIG. 2, the printer 100 includes a control portion 4. The control portion 4 controls the individual portions of the printer 100. The control portion 4 includes a CPU 5 (which corresponds to a processing circuit) and an image processing portion 40 that generates image data used for printing. The CPU 5 is a central processing unit, and performs control and computation on the individual portions of the printer 100 based on control programs and control data stored in a storage portion 50. The storage portion 50 is a combination of a volatile storage device such as a RAM and a non-volatile storage device such as a ROM, a flash ROM or a HDD.

The control portion 4 controls the print portion 3 (the paper feed portion 3a, the transport portion 3b, the image formation portion 3c, the fixing device 1 and the double-sided transport portion 3d) that printing by transporting a sheet, forming a toner image, transfer and fixing. The control portion 4 performs computation and processing for controlling the print portion 3 based on the details stored in the storage portion 50. The control portion 4 recognizes the details of settings performed on the operation panel 2, and recognizes the details of a job and the settings.

A communication portion 41 is connected to the control portion 4. The communication portion 41 is an interface for communicating with a computer 200 such as a personal computer or a server. The communication is performed through a network, a public line, a connection cable and the like. The communication portion 41 receives image data and print data including print settings from the computer 200. Then, based on the received print data, the control portion 4 makes the print portion 3 perform printing.

(Fixing Device 1)

Figure 3:
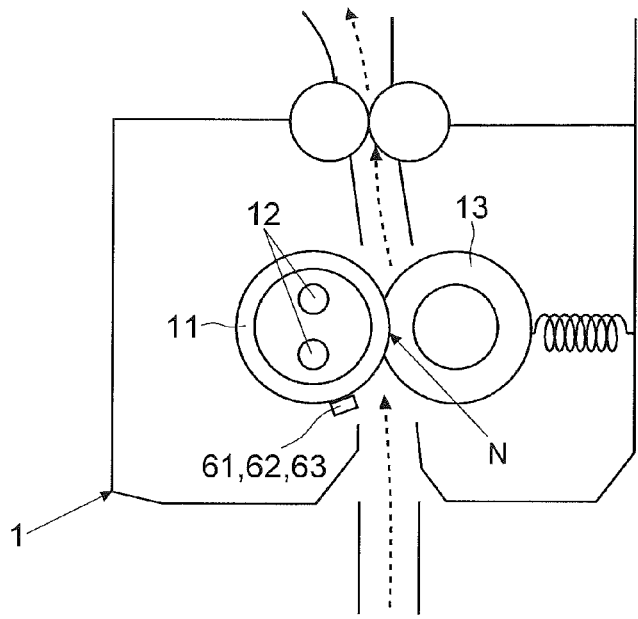
FIG. 3 is a diagram showing an example of a fixing device according to the embodiment.

The fixing device 1 according to the embodiment will then be described with reference to FIGS. 1, 3 and 4. As shown in FIG. 1, the printer 100 includes the fixing device 1. As shown in FIGS. 1 and 3, the fixing device 1 includes a heating roller 11 (which corresponds to a heating rotation member) that is heated by a heater 12 and a pressure roller 13 that is pressed by the heating roller 11. The heating roller 11 makes contact with the sheet, and heats the toner image transferred to the sheet. The pressure roller 13 presses the toner image to fix it to the sheet. The heating roller 11 and the pressure roller 13 are rotatably supported such that the directions of the shaft lines are parallel to each other.

The circumferential surface of the heating roller 11 is made of metal (aluminum or iron) and is formed in the shape of a tube or a sleeve. The heater 12 is incorporated in the heating roller 11. In the printer 100 of the present embodiment, a halogen heater is used. However, a heat source such as an IH heater may be used. On the other hand, the pressure roller 13 has, on its circumferential surface, an elastic layer that is deformed according to the shape of the heating roller 11. The elastic layer is formed of a resin such as silicon sponge.

The heating roller 11 and the pressure roller 13 are pressed on each other to produce a fixing nip N. The sheet to which the toner image is transferred is passed through the fixing nip N. At the time of the passage, the sheet and the toner image transferred to the sheet are heated and pressurized. Consequently, the toner image is fixed to the sheet.

In the printer 100, the sheet is transported such that the center of the sheet in a main scanning direction (direction perpendicular to the transport direction) coincides with the center of the shaft line of the heating roller 11. When printing is performed, it is necessary to turn on and off the heater 12 such that the temperature of the part of the heating roller 11 which makes contact with the sheet is maintained at a temperature suitable for fixing (fixing control temperature, for example, about 170° C.). Hence, it is necessary to detect the temperature of the part of the heating roller 11 which makes contact with the sheet. Depending on the size of the sheet, the sheet does not make contact with both end portions of the heating roller 11, and thus the temperature of both end portions may be excessively increased. Hence, it is necessary to detect the temperature of the end portions of the heating roller 11.

In order to detect the temperatures of a plurality of positions of the heating roller 11, a plurality of thermistors are provided. As shown in FIG. 4, at least a thermistor 61 for detecting the temperature of a center portion of the heating roller 11 and a thermistor 62 for detecting the temperature of one end portion of the heating roller 11 are provided. In other words, at least two thermistors are provided. In order to detect the temperature of the other end portion of the heating roller 11, a third thermistor 63 may be provided in the position of the other end of the heating roller 11 (see FIG. 4). As shown in FIG. 3, the individual thermistors can be provided in the vicinity of the position of the entrance of the sheet. The thermistors are in contact with the heating roller 11. In the thermistors, the portions of the heating roller 11 in contact with the thermistors are targets to be detected. Non-contact thermistors may be used.

(Temperature Control on Fixing Device 1)

Figure 5:
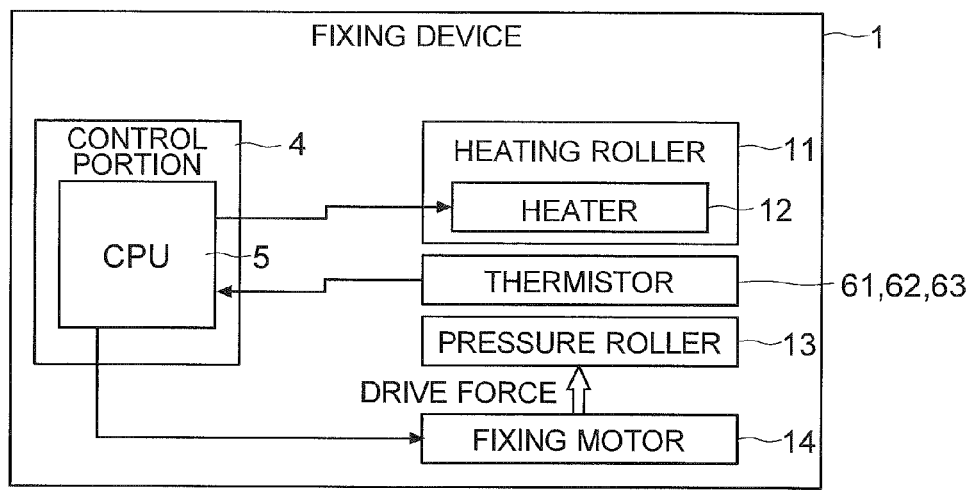
FIG. 5 is a diagram for illustrating control by the fixing device according to the embodiment.

Temperature control on the fixing device 1 will then be described with reference to FIGS. 3 and 5. The control portion 4 (the CPU 5) controls the energization of the heater 12 (the output of the heater 12) (see FIG. 5).

Figure 4:
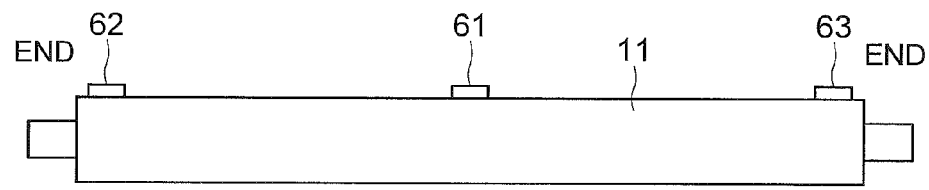
FIG. 4 is a diagram showing an example of a position where thermistors are provided according to the embodiment.

On the heating roller 11, at least two thermistors 61 and 62 are provided (see FIG. 4). In the present embodiment, the control portion 4 (the CPU 5) recognizes, based on the outputs of the thermistors 61, 62 and 63, the temperatures of the center and the end portions of the heating roller 11 (the details of which will be described later).

The control portion 4 (the CPU 5) controls the operation of a fixing motor 14 that rotates the heating roller 11 and the pressure roller 13. At the time of printing or startup, the control portion 4 energizes the heater 12 to heat the heating roller 11. The control portion 4 rotates the fixing motor 14. Thus, the heating roller 11 and the pressure roller 13 are rotated. Since they are pressed on each other, the pressure roller 13 follows the rotation of the heating roller 11. Since the fixing device 1 is controlled in this way, the control portion 4 functions as part of the fixing device 1.

When the main power supply of the printer 100 is turned on or when a normal mode is returned from a power-saving mode, the control portion 4 performs fixing warm-up processing. The fixing warm-up processing is processing in which the heater 12 is energized to increase the temperature of the heating roller 11 which is cold to a predetermined fixing control temperature. The control portion 4 recognizes the temperatures of the heating roller 11 based on the outputs of the thermistors 61 and 62. The control portion 4 recognizes whether or not both the temperatures of the center and the end portions of the heating roller 11 exceed the fixing control temperature.

During the printing, in the normal mode before transfer to the power-saving mode, the control portion 4 maintains the temperature of the heating roller 11 at the fixing control temperature (temperature maintenance control). During the temperature maintenance control, based on the outputs of the thermistors 61 and 62, when the temperature of any one of the center and the end portions of the heating roller 11 or both the temperatures thereof become equal to or less than the fixing control temperature, the heater 12 is energized whereas when the temperature of any one of the center and the end portions of the heating roller 11 or both the temperatures thereof exceed the fixing control temperature, the energization of the heater 12 is stopped.

(Temperature Detection)

Figure 14:
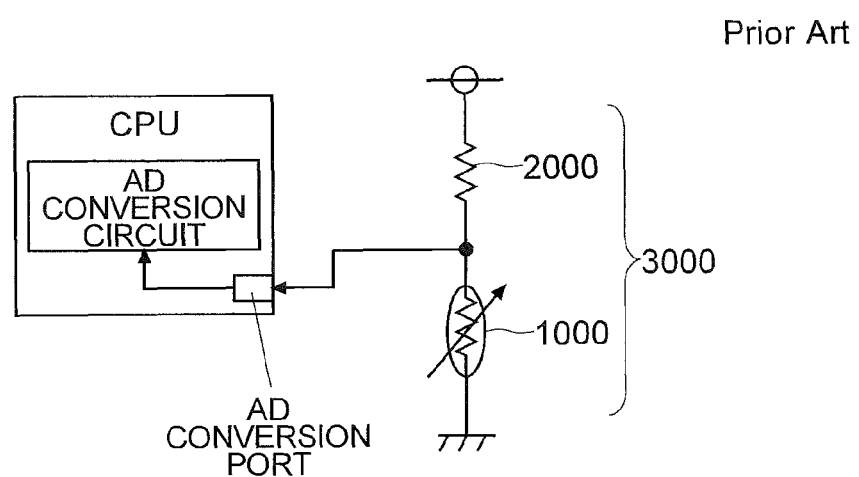
FIG. 14 is a diagram showing an example of a conventional temperature detection circuit.

Temperature detection in the fixing device 1 according to the embodiment will then be described with reference to FIGS. 6 to 10. Conventionally, in the image forming apparatus, as described with reference to FIG. 14, a series circuit 3000 of a thermistor 1000 provided on a target to be detected and a resistor 2000 is provided. The target temperature to be detected is detected based on the magnitude of a voltage between the thermistor 1000 and the resistor 2000. In the detection described above, the following fact is utilized: the resistance value of the thermistor 1000 is varied with the temperature, and a partial voltage ratio between the thermistor 1000 and the resistor 2000 is varied with the target temperature to be detected.

In conventional temperature detection, one AD conversion circuit is needed for a series circuit of a thermistor and a resistor. AD conversion circuits corresponding to the number of thermistors that are provided (the number of targets to be detected) need to be provided. Hence, it is impossible to reduce the AD conversion circuits, and this prevents the manufacturing cost of the image forming apparatus from being reduced. When an AD conversion circuit incorporated in a CPU is used, the AD conversion ports of the CPU corresponding to the number of thermistors that are provided are occupied. It is necessary to adopt a CPU that has the AD conversion ports corresponding to the number of thermistors that are provided. Hence, the CPUs that can be selected may be limited.

Hence, the fixing device 1 of the present embodiment uses only general-purpose ports to detect the target temperatures to be detected with the thermistors (at least the center and one end of the heating roller 11) without the use of the AD conversion circuit and the AD conversion port of the CPU.

The fixing device 1 includes a sensor circuit portion 7 and a signal circuit portion 8. The sensor circuit portion 7 is a portion that functions as a temperature sensor. The sensor circuit portion 7 includes a plurality of series circuits of thermistors for detecting the temperatures of the heating roller 11 and capacitors. FIG. 6 shows an example where the sensor circuit portion 7 includes a series circuit 91 of a thermistor 61 and a capacitor 71 and a series circuit 92 of a thermistor 62 and a capacitor 72. The capacitor 71 and the capacitor 72 of the series circuits differ from each other in capacitance. The relationship of the capacitances is that capacitor 71<capacitor 72. The thermistor 61 and the thermistor 62 are the same as each other (have the temperature characteristic of the same resistance value, that is, the same specifications). The temperature characteristic of the resistance value of the thermistor 61 may differ from the temperature characteristic of the resistance value of the thermistor 62.

The signal circuit portion 8 of the present embodiment includes an exclusive OR circuit 81 (EXOR circuit). The signal circuit portion 8 includes two input terminals. A sensor output voltage V1 that is a voltage between the thermistor 61 and the capacitor 71 in the series circuit 91 is input to one input terminal A. A sensor output voltage V2 that is a voltage between the thermistor 62 and the capacitor 72 in the series circuit 92 is input to the other input terminal B.

FIG. 7 is a truth table of the output signal X of the signal circuit portion 8 (the exclusive OR circuit 81). The signal circuit portion 8 recognizes that a state where the magnitude of the sensor output voltage V1 input to the input terminal A exceeds a predetermined threshold value V0 is high. On the other hand, the signal circuit portion 8 recognizes that a state where the magnitude is equal to or less than the threshold value V0 is low. The signal circuit portion 8 recognizes that a state where the magnitude of the sensor output voltage V2 input to the input terminal B exceeds the predetermined threshold value V0 is high and that a state where the magnitude is equal to or less than the threshold value V0 is low.

In this way, each time the sensor output voltage V1 and the sensor output voltage V2 exceed the predetermined threshold value V0, the signal circuit portion 8 switches between the high level and the low level of the output signal X (see FIG. 7).

On the other hand, the CPU 5 includes a voltage output port 51 and an input port 52. The voltage output port 51 and the input port 52 are general-purpose ports. One end of each of the thermistors 61 and 62 is connected to the voltage output port 51 of the CPU 5. In other words, the series circuits 91 and 92 are connected to the voltage output port 51 so as to be parallel to each other. The output signal X of the signal circuit portion 8 is input to the input port 52 of the CPU 5. When the voltage value of the output signal X exceeds a predetermined reference value, the CPU 5 recognizes that the output signal X is high whereas when the voltage value of the output signal X is equal to or less than the reference value, the CPU 5 recognizes that the output signal X is low. As described above, the CPU 5 of the control portion 4 functions as part of the fixing device 1.

Here, an example of the flow of temperature detection in the heating roller 11 will be described with reference to the timing chart of FIG. 8. In FIG. 8, the uppermost chart shows a state of the output of the voltage output port 51 in the CPU 5. FIG. 8 shows that at a time A1, the CPU 5 simultaneously starts the application of a voltage to each of the series circuits.

The second chart of FIG. 8 shows variations in the state of the output signal X of the signal circuit portion 8 (the EXOR circuit). The third chart of FIG. 8 shows an example of variations in the voltage (the sensor output voltage V1) between the thermistor 61 and the capacitor 71. The fourth chart of FIG. 8 shows an example of variations in the voltage (the sensor output voltage V2) between the thermistor 62 and the capacitor 72. In FIG. 8, the level of the threshold value V0 in the signal circuit portion 8 is indicated by broken lines.

The capacitor 71 and the capacitor 72 differ from each other in capacitance. In the fixing device 1 of the present embodiment, the capacitor 72 is higher in capacitance than the capacitor 71. When the application of voltages is started simultaneously, in the sensor output voltage V2, the time until the threshold value V0 is exceeded is lengthened. Since the temperature of the same heating roller 11 is detected, the order in which the threshold value V0 is exceeded is basically that the sensor output voltage V1 is the first and the sensor output voltage V2 is the second.

In order to detect the temperature of the target to be detected with the thermistor 61 (the center position of the heating roller 11) connected to the capacitor 71 whose capacitance is lower, the CPU 5 measures a rising time t1 since the start of the voltage application to each of the series circuits until the output signal X of the signal circuit portion 8 rises. In other words, the CPU 5 measures the rising time t1 since the start of the voltage application to each of the series circuits until the sensor output voltage V1 exceeds the threshold value V0.

In order to detect the temperature of the target to be detected with the thermistor 62 (the end portion of the heating roller 11) connected to the capacitor 72 whose capacitance is higher, the CPU 5 measures a falling time t2 since the start of the voltage application to each of the series circuits until the output signal X of the signal circuit portion 8 falls. In other words, the CPU 5 measures the falling time t2 since the start of the voltage application to each of the series circuits until the sensor output voltage V2 exceeds the threshold value V0.

Here, in general, in a series circuit of a resistor and a capacitor, a general solution of variations (transient phenomenon) in a voltage applied to the capacitor is represented by formula 1 below.

$$Vc = V\{1 - \exp(-t/RC)\} \quad \text{(Formula 1)}$$

where Vc represents the magnitude of a voltage across both ends of the capacitor, R represents the resistance value of the resistor, C represents the capacitance of the capacitor and V represents the magnitude of the voltage applied to the series circuit.

As RC is increase (as the time constant is increased), the value of exp (−t/RC) is increased, and the rising of Vc is delayed (the reaction is slowed). As RC is decreased (as the time constant is decreased), the value of exp (−t/RC) is decreased, and the rising of Vc is made early (the reaction becomes fast).

The resistance value of the thermistor 61 and the thermistor 62 in the present embodiment is varied depending on the temperature. FIG. 9 is a graph on the sensor output voltage V1. FIG. 9 shows that the rising time t1 is varied with the target temperature to be detected. In the example of FIG. 9, since as the target temperature to be detected is increased, the rising time t1 is shortened, it can be said that the thermistor 61 is a thermistor of a type in which as the target (in contact) temperature to be detected is increased, the resistance value is decreased. Although a graph differs from that shown in FIG. 9, there is a similar tendency on the sensor output voltage V2 (the falling time t2). In other words, the falling time t2 is varied with the target temperature to be detected, and as the target temperature to be detected with the thermistor 62 is increased, the falling time t2 is shortened.

The rising time t1 and the falling time t2 in FIG. 8 are varied with the target temperature to be detected. In other words, the CPU 5 can recognize the target temperature to be detected with the thermistor 61 based on the rising time t1 since the start of the voltage application to one series circuit 91 (circuit whose capacitance is the lowest) until the output signal X rises. The CPU 5 can recognize the target temperature to be detected with the thermistor 62 based on the falling time t2 since the start of the voltage application to the other series circuit 92 (circuit whose capacitance is the highest) until the output signal X falls.

Specifically, the CPU 5 can determine, based on a computation formula obtained by modifying (formula 1), the resistance values of the thermistors and can determine, based on the data sheet of the thermistors, the target temperatures to be detected for the determined resistance values. When the target temperatures to be detected are determined in this way, the computation formula and the data sheet are stored in the storage portion 50. Then, the CPU 5 can recognize the target temperature to be detected with each of the thermistors based on the computation formula and the data sheet stored.

In the fixing device 1 of the present embodiment, as shown in FIG. 10, the storage portion 50 stores temperature detection data D1 that defines the target temperature to be detected with the thermistor 61 corresponding to the rising time t1 and the target temperature to be detected with the thermistor 62 corresponding to the falling time t2. A test is previously performed, and thus the temperatures corresponding to the rising time t1 and the falling time t2 are defined. FIG. 10 shows the temperature detection data D1 that defines, in increments of 1° C., temperatures corresponding to the rising time t1 and the falling time t2.

The CPU 5 measures the rising time t1 and references the temperature detection data D1. Then, the CPU 5 determines a time closest to the rising time t1 measured among predetermined times defined in the temperature detection data D1. Then, the CPU 5 recognizes that the temperature corresponding to the time closest to the rising time t1 is the target temperature to be detected with the thermistor 61. The CPU 5 measures the falling time t2 and references the temperature detection data D1 Then, the CPU 5 determines a time closest to the falling time t2 measured among the predetermined times defined in the temperature detection data D1. Then, the CPU 5 recognizes that the temperature corresponding to the time closest to the rising time t1 is the target temperature to be detected with the thermistor 62. In other words, the CPU 5 recognizes, based on the temperature detection data D1, the target temperature to be detected with the thermistor 61 corresponding to the rising time, and recognizes, based on the temperature detection data D1, the target temperature to be detected with the thermistor 62 corresponding to the falling time.

(Variations)

Variations of the present embodiment will then be described with reference to FIGS. 11 to 13. In the discussion of the above embodiment, the following examples are described.

(1) The two series circuits of the thermistors and the capacitors are provided.

(2) The exclusive OR circuit 81 is used as the signal circuit portion 8.

(3) The CPU 5 recognizes, based on the rising time t1, the target temperature to be detected with the thermistor 61 of the series circuit 91 in which the capacitance of the capacitor is lower, and recognizes, based on the falling time t2, the target temperature to be detected with the thermistor 62 of the series circuit 92 in which the capacitance of the capacitor is higher.

An example where three series circuits of thermistors and capacitors are provided will first be described as a variation. Even in the variation, the AD conversion circuit and the AD conversion port of the CPU are not used, and with only general-purpose ports, the target temperatures (the center and one end portion of the heating roller 11) to be detected with the thermistors 61, 62 and 63 are detected.

In the variation, the sensor circuit portion 7 includes three series circuits of thermistors for detecting the temperatures of the heating roller 11 and capacitors. Specifically, the sensor circuit portion 7 includes the series circuit 91 of the thermistor 61 and the capacitor 71, the series circuit 92 of the thermistor 62 and the capacitor 72 and a series circuit 93 of the thermistor 63 and a capacitor 73 (see FIG. 11). In other words, in the sensor circuit portion 7 of the variation, the series circuit 93 is added to the embodiment.

The capacitors 71, 72 and 73 differ from each other in capacitance. Specifically, the relationship of the capacitances is that capacitor 71<capacitor 72<capacitor 73. The thermistors 61, 62 and 63 are the same as each other (have the same temperature characteristic, that is, the same specifications). In the thermistor 61, the temperature of the center of the heating roller 11 is the target to be detected. In the thermistor 62, the temperature of one end portion of the heating roller 11 is the target to be detected. In the thermistor 63, the temperature of the other end portion of the heating roller 11 is the target to be detected (see FIG. 4).

In the present variation, the signal circuit portion 8 is a combination of a plurality of logic circuits. The signal circuit portion 8 of the variation includes three input terminals. A voltage (sensor output voltage V1) between the thermistor 61 and the capacitor 71 in the series circuit 91 is input to the input terminal A. A voltage (sensor output voltage V2) between the thermistor 62 and the capacitor 72 in the series circuit 92 is input to the input terminal B. A voltage (sensor output voltage V3) between the thermistor 63 and the capacitor 73 in the series circuit 93 is input to an input terminal C.

When logic circuits are combined, a logic circuit other than the EXOR may be used. FIG. 11 shows an example where the signal circuit portion 8 shown in FIG. 6 is used as an assistant and an exclusive OR circuit 82 is further added. The example of FIG. 11 is the same as the example of FIG. 6 in that the sensor output voltages V1 and V2 are connected to the input terminals A and B of the signal circuit portion 8 (the exclusive OR circuit 81). FIG. 11 shows an example where the sensor output voltage V3 is input to the one input terminal C of the added exclusive OR circuit 82 and a ground is connected to the other terminal.

A truth table of the output of each of the exclusive OR circuits 81 and 82 in the signal circuit portion 8 is the same as in FIG. 7. Each of the exclusive OR circuits 81 and 82 recognizes that a high-level voltage is input when the magnitude of a voltage input to the input terminal exceeds a predetermined threshold value V0. On the other hand, the exclusive OR circuit 81 recognize that the input voltage is low when the magnitude of the input voltage is equal to or less than the predetermined threshold value V0.

In this way, when the sensor output voltage V1 exceeds the threshold value V0, the exclusive OR circuit 81 outputs a high-level voltage whereas when the sensor output voltage V2 exceeds the threshold value V0, the exclusive OR circuit 81 outputs a low-level voltage. When the sensor output voltage V3 exceeds the threshold value V0, the exclusive OR circuit 82 outputs a high-level voltage. As described above, each time the sensor output voltage from each of the series circuits exceeds the threshold value V0, the signal circuit portion 8 switches between the high level and the low level of the output signal X (see FIG. 12). In other words, when among a plurality of input voltages, the input voltage first exceeds the threshold value V0, the signal circuit portion 8 outputs a high-level voltage, thereafter when the sensor output voltage V2 exceeds the threshold value V0, the signal circuit portion 8 outputs a low-level voltage and when the sensor output voltage V3 exceeds the threshold value V0, the signal circuit portion 8 outputs a high-level voltage.

One ends of the thermistors 61, 62 and 63 are connected to the voltage output port 51 of the CPU 5 so as to be parallel to each other. In other words, the series circuits are connected to the CPU 5 so as to be parallel to each other. The output signal X of the signal circuit portion 8 is also input to the input port 52 of the CPU 5. When the voltage value of the output signal X exceeds a predetermined reference value, the CPU 5 recognizes that the output signal X is high. When the voltage value of the output signal X is equal to or less than the predetermined reference value, the CPU 5 recognizes that the output signal X is low.

An example of the flow of the temperature detection in the heating roller 11 will then be described with reference to the flowchart of FIG. 12. In FIG. 12, the uppermost chart shows the state of the output of the voltage output port 51 in the CPU 5. FIG. 12 shows that at the time of A1, the CPU 5 simultaneously starts the application of a voltage to each of the series circuits.

Figures 12, 13:
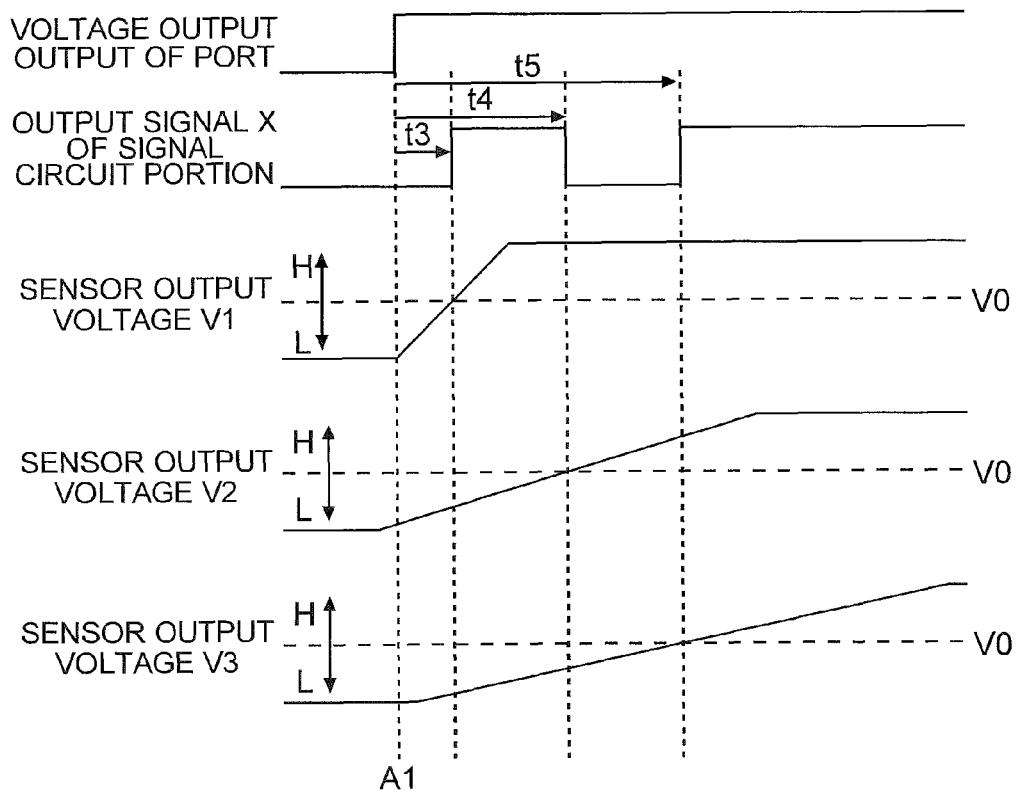
FIG. 12 is a timing chart showing an example of variations in signals on the temperature detection in the fixing device according to the variation.
FIG. 13 is a diagram showing an example of temperature detection data used to detect the target temperatures to be detected with the thermistors in the variation.

The second chart from the top of FIG. 12 shows variations in the state of the output signal X of the signal circuit portion 8. The third chart from the top of FIG. 12 shows an example of variations in the voltage (the sensor output voltage V1) between the thermistor 61 and the capacitor 71. The fourth chart from the top of FIG. 12 shows an example of variations in the voltage (the sensor output voltage V2) between the thermistor 62 and the capacitor 72. The lowermost chart of FIG. 12 shows an example of variations in the voltage (the sensor output voltage V3) between the thermistor 63 and the capacitor 73. In FIG. 12, the levels of the threshold value V0 of inputs A, B and C to the signal circuit portion 8 are indicated by broken lines.

The capacitors 71, 72 and 73 differ from each other in capacitance (capacitor 71<capacitor 72<capacitor 73).

Hence, the order in which the sensor output voltages exceed the threshold value V0 is the order of the sensor output voltage V1 (which corresponds to the capacitor 71), the sensor output voltage V2 (which corresponds to the capacitor 72) and the sensor output voltage V3 (which corresponds to the capacitor 73). Since the temperature of the same heating roller 11 is detected, the order in which the threshold value V0 is exceeded is basically constant.

In order to detect the target temperature (the center position of the heating roller 11) to be detected with the thermistor 61 connected to the capacitor 71 whose capacitance is the lowest, the CPU 5 measures a rising time (a first time t3) since the start of the voltage application to each of the series circuits until the output signal X of the signal circuit portion 8 first rises. The CPU 5 measures, as the rising time, the first time t3 since the start of the voltage application to each of the series circuits until the sensor output voltage V1 exceeds the threshold value V0.

In order to detect the target temperature (one end portion of the heating roller 11) to be detected with the thermistor 62 connected to the capacitor 72 whose capacitance is the second largest, the CPU 5 measures a falling time (a second time t4) since the start of the voltage application to each of the series circuits until the output signal X first rises and then first falls. In other words, the CPU 5 measures, as the falling time, the second time t4 since the start of the voltage application to each of the series circuits until the sensor output voltage V2 exceeds the threshold value V0.

Furthermore, in order to detect the target temperature (the other end portion of the heating roller 11) to be detected with the thermistor 63 connected to the capacitor 73 whose capacitance is the largest, the CPU 5 measures a rising time (a third time t5) since the start of the voltage application to each of the series circuits until the output signal X of the signal circuit portion 8 rises for the second time. In other words, the CPU 5 measures the third time t5 since the start of the voltage application to each of the series circuits until the sensor output voltage V3 exceeds the threshold value V0.

As described above, the CPU 5 measures the first time t3 since the start of the voltage application to each of the series circuits until the output signal X first rises, the second time t4 until the output signal X first rises and then first falls and the third time t5 until the output signal X rises for the second time.

In any of the thermistors 61, 62 and 63 in the present variation, the resistance value thereof is varied with the temperature. As shown in FIG. 9, the thermistors 61, 62 and 63 are the thermistor of a type in which as the target (in contact) temperature to be detected is increased, the resistance value is decreased. As described with reference to FIG. 9, the first time t3, the second time t4 and the third time t5 in FIG. 12 are varied with the target temperatures to be detected.

In other words, the CPU 5 recognizes, based on the first time t3, the target temperature to be detected with the thermistor 61. The CPU 5 recognizes, based on the second time t4, the target temperature to be detected with the thermistor 62. Furthermore, the CPU 5 recognizes, based on the third time t5, the target temperature to be detected with the thermistor 63.

The CPU 5 can determine, based on the computation formula obtained by modifying (formula 1), by computation, the target temperatures to be detected with the thermistors. However, even in the variation, as shown in FIG. 13, the storage portion 50 stores the temperature detection data D1 that defines the target temperatures to be detected with the thermistors in the series circuits for the first time t3, the second time t4 and the third time t5. A test is previously performed, and thus the values of the temperatures corresponding to the first time t3, the second time t4 and the third time t5 are defined. FIG. 13 shows the temperature detection data D1 that defines, in increments of 1° C., temperatures corresponding to the first time t3, the second time t4 and the third time t5.

The CPU 5 measures the first time t3 and references the temperature detection data D1. Then, the CPU 5 determines a time closest to the first time t3 measured among the temperature detection data D1. Then, the CPU 5 recognizes that the temperature corresponding to the time closest thereof is the target temperature to be detected with the thermistor 61. The CPU 5 measures the second time t4 and references the temperature detection data D1. Then, the CPU 5 determines a time closest to the second time t4 measured among the temperature detection data D1. Then, the CPU 5 recognizes that the temperature corresponding to the time closest thereto is the target temperature to be detected with the thermistor 62. Furthermore, the CPU 5 measures the third time t5 and references the temperature detection data D1. The CPU 5 determines a time closest to the third time t5 measured among the temperature detection data D1. The CPU 5 recognizes that the temperature corresponding to the time closest thereto is the target temperature to be detected with the thermistor 63.

As described above, the fixing device 1 according to each of the embodiment and the variation includes the heating rotation member (heating roller 11), the heater 12, the sensor circuit portion 7, the signal circuit portion 8 and the processing circuit (CPU 5). The heating rotation member (heating roller 11) heats the toner image transferred to the sheet. The heater 12 heats the heating rotation member. The sensor circuit portion 7 includes a plurality of series circuits (series circuits 91 and 92) of the thermistors (thermistors 61 and 62) for detecting the temperatures of the heating rotation member and the capacitors (capacitors 71 and 72). In the variation, the sensor circuit portion 7 further includes the thermistor 63, the capacitor 73 and the series circuit 93. The capacitors in the series circuits differ from each other in capacitance.

The sensor output voltages V1, V2 and V3 which are voltages between the thermistors and the capacitors of the series circuits are input to the signal circuit portion 8, and each time the sensor output voltage that exceeds the predetermined threshold value V0 is increased, the signal circuit portion 8 switches between the high level and the low level of the output signal X. The processing circuit is a port for applying a voltage to each of the series circuits, is connected to one end of the thermistor in each of the series circuits, includes the voltage output port 51 to which the series circuits are connected so as to be parallel to each other and the input port 52 to which the output signal X is input, measures the rising time t1 (in the case of the variation, the first time t3 and the third time t5) since the start of the voltage application to each of the series circuits until the output signal X rises and the falling time (in the case of the variation, the second time t4) since the start of the voltage application to each of the series circuits until the output signal X falls and recognizes the target temperature to be detected with each of the thermistors based on the rising time and the falling time.

The time (the transient phenomenon of the RC series circuit) since the start of the voltage application to each of the series circuits until the sensor output voltage (voltage across the terminals of each of the capacitors) exceeds the threshold value V0 has a length corresponding to each of the resistance values (the target temperature to be detected with each of the thermistors). Hence, based on the time, the target temperature to be detected with each of the thermistors can be detected.

The capacitors differ from each other in capacitance. Hence, the time since the start of the voltage application to each of the series circuits until the sensor output voltage exceeds the threshold value V0 differs depending on each of the series circuits. In other words, the sensor output voltages exceed the threshold value V0 sequentially from the sensor output voltage corresponding to the capacitor (capacitor 71) whose capacitance is low. Hence, it is possible to find out which edge of the output signal X corresponds to which one of the thermistors. Thus, it is possible to determine the target temperature to be detected with each of the thermistors based on the time since the start of the voltage application to each of the series circuits until each edge of the output signal X.

As described above, in the present fixing device 1, without the use of the AD conversion circuit or the AD conversion ports included in the integrated circuit, it is possible to detect and recognize the target temperatures to be detected with a plurality of thermistors. Hence, it is not necessary to provide the AD conversion circuit for each thermistor. It is not necessary to provide a large number of AD conversion circuits and to adopt an integrated circuit having a large number of AD conversion port. It is possible to adopt an integrated circuit (CPU 5) that has a small number of AD conversion ports (internal AD conversion circuits). Hence, it is possible to increase the choices of the integrated circuit mounted on the fixing device 1 or the image forming apparatus. It is also possible to reduce the manufacturing cost of the fixing device 1.

The storage portion 50 of the image forming apparatus (the printer 100) stores the temperature detection data D1 that defines the target temperatures to be detected with the thermistors for the rising time t1 (the first time t3 and the third time t5) and the falling time t2 (the second time t4). The processing circuit (CPU 5) recognizes the target temperatures to be detected with the thermistors 61, 62 and 63 based on the temperature detection data D1. In this way, it is possible to easily detect and recognize the target temperatures to be detected with the thermistors without performing complicated computation.

Specifically, in the image forming apparatus (the printer 100) of the embodiment, the two series circuits (the series circuits 91 and 92) are provided. The signal circuit portion 8 is the exclusive OR circuit 81. The processing circuit (CPU 5) recognizes, based on the rising time t1, the target temperature to be detected with the thermistor 61 of the series circuit 91 in which the capacitance of the capacitor is lower, and recognizes, based on the falling time t2, the target temperature to be detected with the thermistor 62 of the series circuit 92 in which the capacitance of the capacitor is higher.

Even when as described above, the two thermistors (thermistors 61 and 62) are provided, as the ports of the processing circuit (CPU 5) necessary for temperature detection on a plurality of places, only one port for applying a voltage to each of the series circuits (series circuits 91 and 92) and one port for receiving the output of the signal circuit portion 8 are needed.

In the fixing device 1 of the variation, the three series circuits (series circuits 91, 92 and 93) of the capacitors and the resistors are provided such that the capacitors (capacitors 71, 72 and 73) differ from each other in capacitance. When among a plurality of input voltages, the input voltage first exceeds the threshold value V0, the signal circuit portion 8 outputs a high-level voltage, and thereafter each time the input voltage exceeding the threshold value V0 is increased, the signal circuit portion 8 switches between the high level and the low level of the output. The processing circuit (CPU 5) measures, as the rising time, the first time t3 since the start of the voltage application to each of the series circuits until the output signal X first rises and the third time t5 until the output signal X rises for the second time, and measures, as the falling time, the second time t4 since the start of the voltage application to each of the series circuits until the output signal X first rises and then first falls. The processing circuit recognizes, based on the first time, the target temperature to be detected with the thermistor 61 connected to the capacitor 71 whose capacitance is the lowest. The processing circuit recognizes, based on the second time, the target temperature to be detected with the thermistor 62 connected to the capacitor 72 whose capacitance is the second largest. The processing circuit recognizes, based on the third time, the target temperature to be detected with the thermistor 63 connected to the capacitor 73 whose capacitance is the largest.

Even when as described above, the three thermistors (thermistors 61, 62 and 63) are provided, as the ports of the processing circuit (CPU 5) necessary for detecting the temperatures of a plurality of target temperatures to be detected, only one port for applying a voltage to each of the series circuits (series circuits 91, 92 and 93) and one port for receiving the output of the signal circuit portion 8 are needed.

The image forming apparatus (the printer 100) of the present embodiment includes the fixing device 1 according to the embodiment or the variation. In this way, the choices of the integrated circuit mounted are increased, the manufacturing cost of the fixing device 1 is reduced and thus it is possible to provide the image forming apparatus that has high performance and that is inexpensive.

Although the embodiment of the present disclosure is described above, the scope of the present disclosure is not limited to the embodiment, and various modifications are possible without departing from the spirit of the disclosure.

What is claimed is:

1. A fixing device comprising:
   a heating rotation member which heats a toner image transferred to a sheet;
   a heater which heats the heating rotation member;
   a sensor circuit portion which includes a plurality of series circuits of thermistors for detecting a temperature of the heating rotation member and capacitors and in which the capacitors of the series circuits differ from each other in capacitance;
   a signal circuit portion to which a sensor output voltage that is a voltage between the thermistor and the capacitor in each of the series circuits is input and which switches between a high level and a low level of an output signal each time the sensor output voltage that exceeds a predetermined threshold value is increased; and
   a processing circuit that includes: a voltage output port which applies a voltage to each of the series circuits and to which the series circuits are connected so as to be parallel to each other; and an input port to which the output signal is input, that measures a rising time since a start of the voltage application to each of the series circuits until the output signal rises and a falling time since the start of the voltage application to each of the series circuits until the output signal falls and that recognizes a target temperature to be detected with each of the thermistors based on the rising time and the falling time.

2. The fixing device according to claim 1, further comprising:
   a storage portion which stores temperature detection data that defines target temperatures to be detected with the thermistors for the rising time and the falling time,
   wherein the processing circuit recognizes, based on the temperature detection data, the target temperature to be detected with the thermistor corresponding to the rising time and recognizes, based on the temperature detection data, the target temperature to be detected with the thermistor corresponding to the falling time.

3. The fixing device according to claim 1,
wherein the two series circuits are provided,
the signal circuit portion is an exclusive OR circuit and
the processing circuit recognizes, based on the rising time, the target temperature to be detected with the thermistor of the series circuit in which the capacitance of the capacitor is lower, and recognizes, based on the falling time, the target temperature to be detected with the thermistor of the series circuit in which the capacitance of the capacitor is higher.

4. The fixing device according to claim 3,
wherein one of the thermistors is used to detect a temperature of a center portion of the heating rotation member, and the other thereof is used to detect a temperature of an end portion of the heating rotation member.

5. The fixing device according to claim 1,
wherein the three series circuits are provided such that the capacitors thereof differ from each other in capacitance,
when among a plurality of input voltages, the input voltage first exceeds the threshold value, the signal circuit portion produces a high-level output, and thereafter each time the input voltage that exceeds the threshold value is increased, the signal circuit portion switches between a high-level output and a low-level output,
the processing circuit measures, as the rising time, a first time since the start of the voltage application to each of the series circuits until the output signal first rises and a third time until the output signal rises for a second time, and measures, as the falling time, a second time since the start of the voltage application to each of the series circuits until the output signal first rises and then first falls,
the processing circuit recognizes, based on the first time, the target temperature to be detected with the thermistor connected to the capacitor whose capacitance is lowest,
the processing circuit recognizes, based on the second time, the target temperature to be detected with the thermistor connected to the capacitor whose capacitance is a second largest and
the processing circuit recognizes, based on the third time, the target temperature to be detected with the thermistor connected to the capacitor whose capacitance is largest.

6. The fixing device according to claim 5,
wherein the signal circuit portion includes two exclusive OR circuits,
the sensor output voltage of the series circuit including the capacitor whose capacitance is the lowest is input to one input terminal of one of the two exclusive OR circuits,
the sensor output voltage of the series circuit including the capacitor whose capacitance is the second largest is input to the other input terminal of one of the two exclusive OR circuits,
the sensor output voltage of the series circuit including the capacitor whose capacitance is the largest is input to one input terminal of the other of the two exclusive OR circuits and
the other input terminal of the other of the two exclusive OR circuits is connected to a ground.

7. The fixing device according to claim 5,
wherein among the thermistors, one thermistor is used to detect a temperature of a center portion of the heating rotation member, another thermistor is used to detect a temperature of an end portion of the heating rotation member and the other thermistor is used to detect a temperature of the other end of the heating rotation member.

8. The fixing device according to claim 1,
wherein the thermistors have a same specification.

9. An image forming apparatus comprising:
the fixing device according to claim 1.

10. A method of controlling a fixing device, the method comprising:
heating, with a heating rotation member, a toner image transferred to a sheet;
heating, with a heater, the heating rotation member;
making capacitors of a plurality of series circuits of thermistors and capacitors provided in the heating rotation member differ from each other in capacitance;
inputting a sensor output voltage that is a voltage between the thermistor and the capacitor in each of the series circuits to a signal circuit portion which switches between a high level and a low level of an output signal each time the sensor output voltage that exceeds a predetermined threshold value is increased;
connecting the series circuits to a voltage output port of a processing circuit such that the series circuits are parallel to each other;
inputting the output signal of the signal circuit portion to an input port of the processing circuit;
measuring a rising time since a start of the voltage application to each of the series circuits until the output signal rises and a falling time since the start of the voltage application to each of the series circuits until the output signal falls; and
recognizing a target temperature to be detected with each of the thermistors based on the rising time and the falling time.

* * * * *